United States Patent Office 3,238,365
Patented Mar. 1, 1966

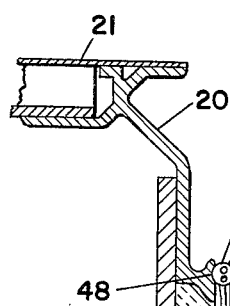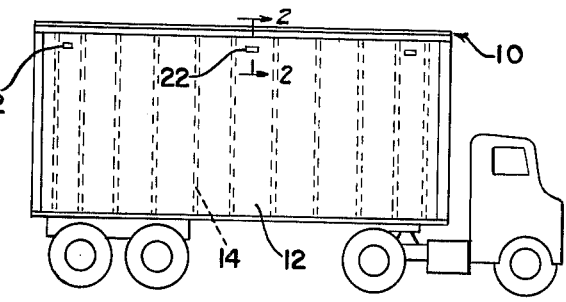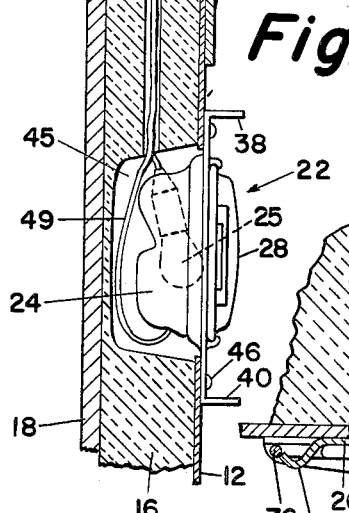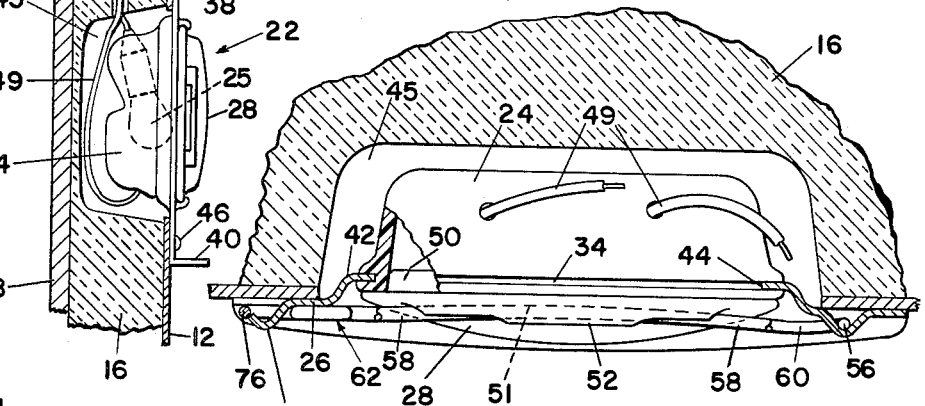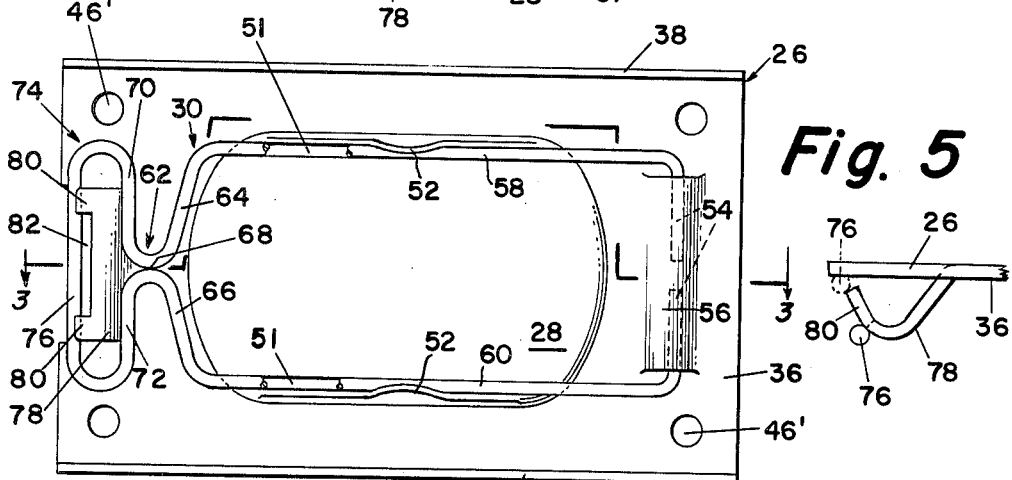
INVENTOR.
ANDREW ABOLINS
BY
*Millman and Jacobs*
ATTORNEYS

3,238,365
FLUSH MOUNTED CLEARANCE LIGHTS
FOR TRAILERS
Andrew Abolins, Penndel, Pa., assignor to Strick Trailers, a Division of Fruehauf Corporation, Philadelphia, Pa., a corporation of Michigan
Filed May 26, 1964, Ser. No. 370,164
5 Claims. (Cl. 240—8.2)

This invention relates to lights in general, but more particularly to clearance lights for vehicles such as trailers, and is a continuation-in-part of my copending application, Serial No. 257,285, filed February 8, 1963, now Patent No. 3,196,267 dated July 20, 1965.

For safety reasons, trailer bodies are required to be equipped with clearance lights along the top thereof. The clearance light disclosed in the parent application is mounted in the top channel of a trailer body and has many advantages such as effecting a shock mounting between the bulbs and the trailer body, relieving pressure on the lens by employing a flexible bulb housing, resisting damage from sweeping tree branches, being easily accessible for replacing bulbs, etc. The primary object of the present invention is to provide a clearance light with a modified lens closure and retaining and mounting means which adapts the same for flush mounting on trailer bodies that do not have top channels as well as for those trailers which have internal posts and external side walls, known in the trade as smooth skin trailers, while retaining the aforementioned advantages.

Another object of the invention is to provide a flush mounted clearance light having a means for easily but securely closing and retaining the lens thereof whereby the locking action requires only finger pressure while the unlocking action requires the aid of a coin or screwdriver.

Another object of the invention is to provide a flush mounted clearance light for a trailer of the character described wherein the closure means for retaining the lens in both the open and closed positions is stretchable to and from said open and closed positions in a substantially single plane.

Another object of the invention is to provide a flush mounted clearance light for trailers in which the lens mounting comprises a bracket mounted on the trailer wall with a cut-out portion into which the lens fits, and a closure means which is hinged to the bracket and engages the lens, the closure means being a stretchable resilient wire substantially in a single plane having an accordion gather or convolution which will permit locking and unlocking of the lens in place by longitudinal stretching of the spring to engage or disengage keepers on the bracket without exertion of lateral pressure on the fracturable lens when the wire is stretched or contracted.

Another object of the invention is to provide a flush mounted clearance light for trailers of the character above described in which the hinge for the lens closure means extends outwardly of the plane of the bracket to serve as a tree branch deflector.

These and other objects of the invention will become more apparent as the following description proceeds in conjunction with the accompanying drawings, wherein:

FIG. 1 is a digrammatic side elevational view of a smooth skin trailer embodying the invention;

FIG. 2 is an enlarged sectional view taken on the line 2—2 of FIG. 1;

FIG. 3 is an enlarged sectional view taken on the line 3—3 of FIG. 4;

FIG. 4 is a face view of the clearance light used in the trailer of FIG. 1 in an unmounted form; and FIG. 5 is an enlarged diagrammatic side view of the keeper end of the mounting bracket.

Specific reference is now made to the drawings in which similar reference characters are used for corresponding elements throughout.

Indicated generally at 10 is a conventional smooth skin trailer body having side walls comprised of panels 12 which are appropriately secured upon inner vertical posts 14. A layer of insulation 16 is used to separate the inner liner 18 from the outer panels 12. A top rail 20 is provided which serves to mount the roof sheet 21 and also as a finishing piece which protects the insulation 16 and the inner liner 18 from the elements. The irregular open, non-channel shape of the top rail 20 shown in the drawings permits stacking of the trailer body 10 upon the other trailer bodies of a similar type.

The lights 22 of the instant invention are mounted in the side panels at desired locations and are electrically connected by appropriate leads to the electrical system in the trailer to provide clearance lights along the top of the body. Each light comprises a flexible insulating housing 24 in which one or more bulbs 25 are mounted, a metallic substantially rectangular rigid bracket or plate 26 to mount the housing, a lens 28 and a means 30 to removably retain the lens on the bracket selectively in front of or away from the housing.

The housing is formed of an elastomeric material such as neoprene and is preferably white for improved reflection. It is molded in substantially cup-shaped form with a groove 34 that runs peripherally around its free edge.

The mounting bracket 26 includes a front face 36, a longitudinally extending pair of flanges 38 and 40 on the top and bottom for increased rigidity, and an inwardly extending rim 42 forming the periphery of a central cut-out portion 44 whose shape and dimensions approximate that of the open end of the lens housing 24.

As shown in FIGS. 2 and 3, it is necessary to cut out a portion of the outer skin 12 and a corresponding area of the insulation 16 as at 45 to make room for the lens housing. The edge or periphery of the cut-out portion of the bracekt is buttoned into the groove 34 to secure the housing 26 which is then inserted into the cut-out portion 45 and there secured in place by appropriate fasteners 46 extending through the bracket and into the panel 12, via holes 46' in the bracket.

Electricity is fed to the bulbs 25 in the housing by means of a two-wire conduit 47 extending in a groove 48 of the top rail 20. The two wires 49 of the conduit are tapped off, made to extend through the insulation and are secured through the lens housing 24 to the bulb sockets (not shown).

The lens 28, which is generally made of a fracturable material, such as glass or plastic, is of the same general contour as that of the open end of the housing 24, includes a peripheral tapered inwardly extending boss 50 to provide a wedging action on closing, upper and lower longitudinal open grooves 51, and upper and lower side opening lips 52.

The lens closure and retaining means 30 is a resilient substantially rectangular wire with split ends 54 that can to spread apart and slipped into the open ends of an outstruck journal or hinge 56 which is on the side of the face 36 of the mounting bracket 26 towards the front of the trailer. The wire further includes a pair of longitudinally extending portions 58 and 60 extending from the split ends that are seated in the longitudinal grooves 51 of the lens 28 beneath the lips 52, and thus the lens is retained by and moves with the spring wire about an axis through the split ends 52 in the journals 56.

Beyond the lens adjacent the end of the bracket opposite the hinge, the wire includes an accordion gather 62 which is comprised of two convolutions. The convolutions are formed by portions 64 and 66 which extend transversely from the longitudinal portions 58 and 60 respectively, meet at 68 and continue transversely in a reverse direction to form portions 70 and 72. The portions 70 and 72 continue and form a further, generally rectangular portion 74 having a transversely extending end portion 76. By virtue of the accordion gather 62, the wire can extend or stretch longitudinally and contract without exerting lateral or transverse pressure on the fracturable lens. Further, the location of the gather also permits the stretching of the spring wire 30 to be confined to a portion of the spring wire to the left of the lens (as seen in FIG. 4), thereby preventing movement of the lens 28 in the direction of any extension of the spring wire 30.

It will be seen from FIG. 4 that the convolutions meet at 68 when the spring wire is relaxed. If the convolutions of the accordion gather were spaced apart in the relaxed position of the wire, they would close up upon application of tension on the spring wire and move outwardly upon release of said tension force, thereby urging the longitudinal portions 58 of the spring laterally or transversely against the lens with the possibility of inducing fracture.

When flush mounted on the side of the trailer, mounting bracket 26 is always so placed that hinge 56 is located towards the front of the trailer or towards the tractor. Since the hinge 56 is upstruck from the mounting bracket 26, and extends outwardly of the front face thereof, it will provide a protective shield for the lens 28 from sweeping tree branches. On the rearward portion of and upstruck from the face 36 of the rigid mounting bracket 26, a keeper 78 is provided which is arcuately formed as shown in FIG. 5. The keeper terminates in two fingers 80 that extend back toward and are spaced from the face 36, there being a slot 82 between the fingers.

The arcuate shape of the upstruck keeper 78 enables the operator to lock the spring retaining wire with applied finger pressure to the end 76 of the wire, but once locked into position, the wire cannot be opened unless a coin or the end of a screwdriver is placed within the notch 82 and the leverage therefrom against the keeper acts to stretch the wire lengthwise in a direction away from and over the keeper. Thus, in operation, to close the housing with the lens, the wire is moved towards the bracket until the end portion 76 thereof engages the keeper 78. By applying finger pressure on the wire towards the bracket, the end portion 76 rides over the keeper until it engages beneath the fingers 80, as shown in FIG. 5, in which action the wire stretches lengthwise, in substantially one plane, the stretch being taken up by the accordion gather 62 much as a bellows. Thus, the operator is provided with a large enough mechanical advantage so as to enable him to use finger pressure to push the spring wire into this locked position.

When the operator is required to open the light for access to the bulbs, he inserts a coin or tool end into the notch 82 and prys the end portion 76 of the wire, which action again stretches the wire lengthwise until the end portion 76 is free of the fingers, whereupon the wire then contracts and, since the convolutions of the accordion gather meet as at 68 when the wire is relaxed, the contraction of the wire will not apply undue pressure on the sides of the lens via the longitudinal portions 58 and 60 of the wire. The tight wedging action of the lens 28 in the flexible housing 24 cooperates with the spring closure means to enhance the locking and unlocking action.

While a preferred embodiment of the invention has here been shown and described, a skilled artisan may make minor variations without departing from the spirit of the invention and the scope of the appended claims.

I claim:

1. A clearance light for a vehicle comprising a mounting bracket having a cut-out portion, an open-faced bulb housing, means mounting said housing on said bracket with said open face at said cut-out portion, a lens to cover said open face of said housing, and means to selectively retain said lens in position to cover and uncover said open face of said housing, said lens retaining means including an elongated resiliently flexible member including spaced portions extending longitudinally across and engaging a portion of said lens, means to hinge said member at one of its ends to said bracket, a keeper on said bracket adapted to releasably engage the other end of said member by exerting a stretching force longitudinally on said member, and constrictions in said spaced portions of said member beyond said lens to absorb the stretching force and thereby restrain application of a lateral force on said lens, said restrictions meeting when said wire is longitudinally relaxed.

2. A clearance light for a vehicle comprising a mounting bracket having a cut-out portion, an open-faced bulb housing, means mounting said housing on said bracket with said open face at said cut-out portion, a lens to cover said open face of said housing, and means to selectively retain said lens in position to cover and uncover said open face of said housing, said lens retaining means including an elongated resiliently flexible member extending longitudinally across and engaging a portion of said lens, means to hinge said member at one of its ends to said bracket, a keeper on said bracket adapted to releasably engage the other end of said member by exerting a stretching force longitudinally on said member, and a constriction in said member beyond said lens to absorb the stretching force and thereby restrain application of a lateral force on said lens, said elongated member being a substantially rectangular spring wire having a pair of longitudinal portions extending longitudinally across and engaging said lens, said constriction being provided in each of said longitudinal portions, and meeting when said wire is longitudinally relaxed.

3. A clearance light for flush mounting on the wall of a vehicle comprising an elongated bracket adapted to be secured to the wall and having a cut-out therein, a flexible bulb housing mounted on said bracket and having an open face substantially contiguous with said cut-out portion, a lens to cover said open face of said housing including longitudinal grooves thereacross, a substantially rectangular elongated spring wire having spaced longitudinal portions retained in said lens grooves, said wire including one end portion hinged to said bracket for movement about an axis transverse to said longitudinal portions and an opposite end portion, a transversely extending accordion gather in said longitudinal portions beyond said lens and adjacent said opposite end portion of said wire, said wire lying substantially in a single plane, and a keeper on said bracket to releasably engage said opposite end portion of said wire and stretch the same longitudinally to effect locking and unlocking action, said gather acting to absorb the stretch force applied on said wire, said keeper including an arcuate member extending outwardly of said bracket and terminating in a locking edge spaced from said bracket, said accordion gather including convolutions which meet when said wire is relaxed to restrain lateral force on said lens when said wire relaxes upon release from said keeper.

4. A clearance light for a vehicle comprising a mounting bracket having a cut-out portion, an open-faced bulb housing, means mounting said housing on said bracket with said open face at said cut-out portion, a lens to cover said open face of said housing, and means to selectively retain said lens in position to cover and uncover said open face of said housing, said lens retaining means including an elongated resiliently flexible member extending longitudinally across and engaging a portion of said lens, means to hinge said member at one of its ends to said bracket, a keeper on said bracket adapted to releasably engage the other end of said member by exerting a stretching force longitudinally on said member, and a constriction in said member beyond said lens to absorb the stretching force and thereby restrain application of a lateral force on said lens, said elongated member being a substantially rectangular spring wire having a pair of longitudinal portions extending longitudinally across and engaging said lens, said constriction being provided in each of said longitudinal portions, said keeper being an arcuate member extending outwardly of said bracket and terminating in an edge spaced from said bracket and said wire including a transverse portion at said other end adapted to ride over said arcuate member until it engages said edge thereof in the locked position, said wire being stretched longitudinally when riding over said arcuate member.

5. The combination of claim 4 wherein said arcuate member includes a pair of inwardly curving fingers, said edge being the free end of each of said fingers, and a transversely extending notch between said fingers adapted to receive a prying tool to engage said transverse portion of said wire and stretch the same around the fingers in the unlocking action.

References Cited by the Examiner
UNITED STATES PATENTS

| | | | |
|---|---|---|---|
| 1,876,852 | 9/1932 | Carbonara | 240—41.55 X |
| 2,208,155 | 7/1940 | Daehler | 240—7.45 X |
| 2,707,747 | 5/1955 | De Frees | 240—41.55 X |
| 3,086,104 | 4/1963 | Atkin | 240—90 X |
| 3,196,267 | 6/1965 | Abolins | 240—41.55 X |

NORTON ANSHER, *Primary Examiner.*

J. F. PETERS, *Assistant Examiner.*